(12) United States Patent
Masoian

(10) Patent No.: US 9,264,100 B1
(45) Date of Patent: Feb. 16, 2016

(54) EMERGENCY COMMUNICATIONS CONTROLLER AND CONSOLE

(75) Inventor: Lee Masoian, West New York, NJ (US)

(73) Assignee: Henry Bros. Electronics, Inc., San Diego, CA (US)

( * ) Notice: Subject to any disclaimer, the term of this patent is extended or adjusted under 35 U.S.C. 154(b) by 932 days.

(21) Appl. No.: 13/409,535

(22) Filed: Mar. 1, 2012
(Under 37 CFR 1.47)

Related U.S. Application Data

(63) Continuation of application No. 12/337,864, filed on Dec. 18, 2008, now Pat. No. 8,145,125.

(60) Provisional application No. 61/008,246, filed on Dec. 19, 2007.

(51) Int. Cl.
*H04B 3/36* (2006.01)
*H04B 7/14* (2006.01)

(52) U.S. Cl.
CPC ... *H04B 3/36* (2013.01); *H04B 7/14* (2013.01)

(58) Field of Classification Search
USPC .............................. 455/7, 8, 9, 12.1, 15, 11.1
See application file for complete search history.

(56) References Cited

U.S. PATENT DOCUMENTS

| | | | |
|---|---|---|---|
| 5,815,799 A * | 9/1998 | Barnes et al. | 455/15 |
| 7,751,806 B1 * | 7/2010 | Vu | 455/418 |
| 8,145,125 B2 | 3/2012 | Masoian et al. | |
| 8,446,847 B2 * | 5/2013 | Li et al. | 370/271 |
| 2011/0276326 A1 * | 11/2011 | Fumarolo et al. | 704/235 |

* cited by examiner

*Primary Examiner* — Peguy Jean Pierre
(74) *Attorney, Agent, or Firm* — Procopio Cory Hargreaves & Savitch LLP

(57) ABSTRACT

An emergency communications device contains dispatch consoles for use by user that contains multiple repeaters and multiple communication networks. The multiple repeaters and multiple communication networks are used for redundancy purposes, in case the repeater or communication network in use becomes disabled for any reason. The device also contains a recorder unit capable of provided instant playback to emergency dispatch personnel independently of whether the unit is recording. The device does not require an external computer to operate.

12 Claims, 4 Drawing Sheets

EMERGENCY COMMUNICATIONS CONTROLLER AND CONSOLE

CROSS-REFERENCE TO RELATED APPLICATION

This invention is a continuation of U.S. patent Ser. No. 12/337,864, filed Dec. 18, 2008, which claims priority of Provisional Application Ser. No. 61/008,246, filed on Dec. 19, 2007, and the contents of each of the aforementioned applications are incorporated herein by reference in their entirety.

FIELD OF THE INVENTION

The present invention relates generally to the field of emergency communication devices.

BACKGROUND OF THE INVENTION

Emergency response personal, such as 911 emergency dispatch centers, police, fire, EMS, subway systems, etc., must be able to communicate effectively, especially during times of an emergency. There are a variety of prior art systems available that allow for such communication, however, such systems are not robust to system failure. Additionally, such systems typically require a complex configuration that typically requires an external or separate computer to operate.

A major problem with prior art emergency communication systems is that they do not typically provide for sufficient backup in the case of critical component failure. As a result, communications between such systems may be significantly affected by, and may not be operable during, the occurrence of emergency events. As an example, it is standard for prior art systems to utilize only one repeater per communications channel. Similarly, it is standard for prior art systems to be operable only on one communications network. If a fire or other catastrophic event were to destroy that repeater or communication network, however, then the ability for emergency response personnel to effectively communicate would be lost.

Another problem with prior art communication systems is that they do not contain a recorder unit that allows for emergency response personnel to quickly diagnose the situation. Such recorder units require the emergency response personnel to stop the recording in order to play back messages. Such units also require the emergency response personnel to navigate complicated controls to rewind tapes for imprecise amounts of time.

SUMMARY OF THE INVENTION

The present invention relates to an emergency communications controller and console ("ECCC") used to centralize and control critical communications equipment, specifically two way radio repeaters. An ECCC that embodies the present invention is designed to remotely control, monitor and interface with commercially available two way radio repeaters, such as those currently being used by emergency personnel.

The present invention utilizes a series of repeaters for redundancy purposes to allow for continued communications, even if a repeater in use becomes disabled or undesirable for any reason. The present invention also utilizes multiple communications networks for redundancy purposes to also allow for continued communications, even if a repeater in use becomes disabled or undesirable for any reason.

Because of the redundancy of both the repeaters and of the communication networks, the system is robust to a catastrophic event or a malfunction that can disable a significant portion of the communication scheme. Using the ECCC of the present invention, if one repeater or communication network is destroyed by a fire or explosion, emergency personnel will still be able to communicate with each other based on the automatic switching to the backup repeater or communication network.

The ECCC of the present invention may also contain a recorder unit capable of providing instant playback to emergency dispatch personnel independently of whether the unit is presently recording. The ECCC of the present invention utilizes a simplified design to allow for easy, rapid deployment by emergency personnel, which may be a stand alone system that does not require an external or separate computer to operate.

DETAILED DESCRIPTION OF EXEMPLARY EMBODIMENTS

Figure 1:
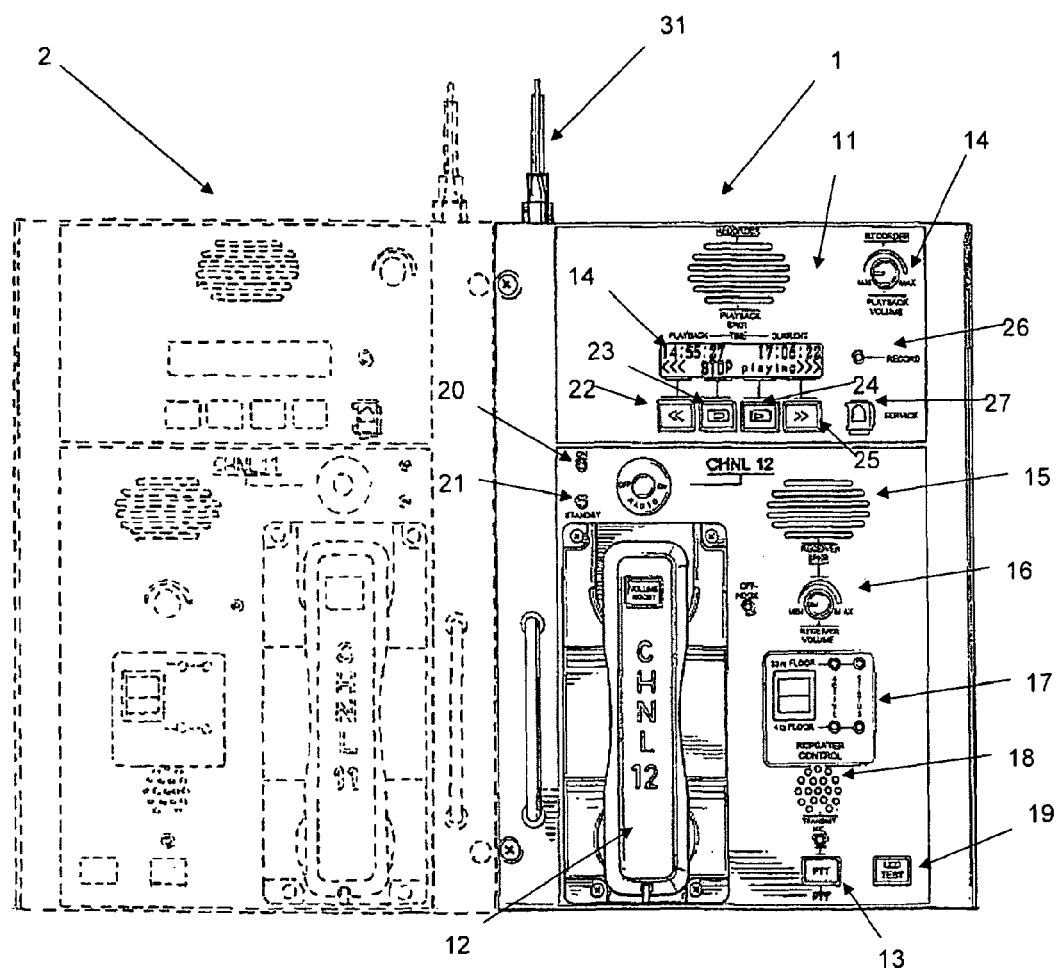
FIG. 1 depicts a structural embodiment of an ECCC according to an embodiment of the present invention.

FIG. 1 demonstrates a structural embodiment of an ECCC according to the present invention. The ECCC may be embodied in a stand-alone console 1, or may be stacked up allowing the use of one ECCC per communication channel. For example, a second (or more) stand-alone console 2 may be stacked together with stand-alone console 1. Combining consoles may allow for the effective control of a battery of redundant repeaters for multiple channels.

The console 1 may have all controls and indicators on the front panel. The console 1 may be on, and in standby mode at all times (which is indicated by standby LED 21). In order to turn the ECCC into active mode, a manual key (e.g., fire department type 2642 key) may be used. In active mode, the ECCC may be able to communicate with the repeaters.

The ECCC may have the ability of functioning as a two way radio, with microphone 18 and speakers 15 built into the console. The volume of the speaker 15 may be controlled by the receiver volume knob 16. The ECCC may also contain a handset 12, in case of noisy environments and/or when privacy for the communication is required. If the handset is in the cradle the speaker and the microphone are active and can be used "hands free". The ECCC may also automatically switch over from speaker 15 to handset 12 once the handset is lifted from its cradle. The ECCC may also contain a front panel push-to-talk switch 13, which may be used to set the direction of the communication while using the front panel's built-in microphone 18 and speaker 15.

In the ECCC, a series of repeaters may be used for redundancy purposes, in case the repeater in use becomes disabled or undesirable for any reason. At the repeater control 17, a user may select among one of two or more repeaters connected to the system via a toggle switch. With the primary repeater selected, a three position momentary switch can select the backup repeater by moving the switch to the up position. There are two Status LED's next to both the up and down switch positions; the LED's indicate the state of the two repeaters and which repeater is selected.

The ECCC may monitor constantly the status of the repeater selected via the Repeater Selection Switch. If a handshake to/from the unit is lost, or the unit becomes disabled, the next available functional repeater is automatically selected and all control/audio lines are automatically redirected to the new repeater. Various round robin or priority based algorithms may be used in the selection of which standby repeater is selected.

The physical polling of the repeaters and the decision algorithm that is used to determine which of the possible multiple repeaters that may be activated as a result of the detection of a failed repeater may proceed in a number of ways. For instance, in the simplest case a repeater may be considered active and available for use if it responds to simple requests for status information with a well formed response message. In a more elaborate situation the ECCC might request signal level or other diagnostic information from the various repeaters within its control domain to determine which of the repeaters is best suited to act as the primary in any given scenario.

It is also possible that through the integration of the ECCC with a computer program, decisions regarding the suitability of a particular repeater could be made by monitoring the RF signaling capability of the distributed antenna system attached to a particular repeater. One example of such a computer program that may be used with the ECCC is known as MCAS (Monitor Control and Status software developed by Airorlite Communications, Inc.), which allows for the digital recording of vital data in the internal data storage unit, such as temperature of the repeater's location, types of alarms, status of the repeaters, and other data as collected by Remote Cell connected to the ring. The MCAS software, or other software known to those skilled in the art, may provide such functions including: periodically polling devices to check status and mode of operation; allowing users to see a detailed report of device status and operational mode; report failures on any of the system devices; upon failure, switch control to backup devices; allow the user to inhibit or activate devices on the network; allow other detailed configuration of individual devices. The MCAS software, or other software known to those skilled in the art, may be capable of monitoring and configuring items including: devices such as amplifiers, channel cards, repeaters; ambient temperature and other sensors; cable failures; network outages; or other custom requirements. The software may allow external computers to connect to the ECCC to download all recorded communications and statuses into the hard drives of the external computer.

The ECCC may have the ability to broadcast emergency messages through the repeater. In some occasions, for example, if the building needs to be evacuated immediately by emergency personnel, the ECCC can take over the repeater and broadcast an announcement, whether pre-recorded on the built-in recorder or by using the console's push-to-talk 13 or the handset 12.

The ECCC can be used in a multiple location configuration for each one of the channels, e.g., channel 11 for the repeaters can have a console on floor 1 and an additional console for the same channel on the 5th floor. Once either one of these consoles is activated, it will remotely disable further operation of the other console(s). This is useful for multiple entrance buildings as well as redundant configuration (i.e. both consoles can be at the same location, if one fails, the other one will take over, controlling both the same set of redundant repeaters and channels). This capability might also be used when the ECCC and its associated network of repeaters resides in multiple buildings within a complex of buildings or a site with many related buildings such as a campus environment or an environment where a real estate company owns and manages several buildings within a geography that may share require a single console to have access to the communications facilities in several local buildings.

The ECCC can also be connected to multiple repeaters on multiple floors, e.g., the 1st floor can have at least two repeaters and the 5th floor can have at least two repeaters. This way, there can be redundancy for the repeaters on each floor and there can also be redundancy of repeaters among multiple floors.

The ECCC may contain a built-in, stand alone, electronic recorder unit 11, which may always be in the Record mode when the key is in the ON position. The recorder unit 11 may have the ability of playing back locally the messages recorded while the recorder is still actively recording the communications in real time. This is especially useful post-emergency responses in order to analyze how the emergency personnel on site communicated during the emergency. This functionality can serve as an audio instant replay during live operation when messages are not comprehended on initial transmission. An emergency responder can either tap rewind button 22—which will rewind the tape for a predetermined interval (e.g., 10 seconds)—or can hold down the rewind button 22 to rewind more quickly—and can listen to instant playback of the tape, independently of what is being recorded at that time. Similarly, the forward button 25 allows an emergency responder to move forward through the message in a similar manner. The recorder unit 11 may also contain mode control buttons such as stop 23, for stopping playback of a message, and play 24, for playing the message. Playback volume may be controlled by the playback volume knob 16.

The recorder unit 11 may only record while a transmission is occurring and not between transmissions. The recorder unit 11 may hold only a limited amount of audio (e.g., 1 hour), and may rewrite at the beginning of memory after the memory has been exceeded. Each console (e.g., 1, 2), may have independent recorders with their own separate memory card. If the recorder unit 11 is in playback, rewind, or fast forward mode and a recording begins, the playback display may continue to be displayed.

The recorder unit 11 may record and time stamp all incoming/outgoing messages to/from the console The ECCC may contain a display 14 that shows the status of the recording unit, messages recorded, time stamps and other important information attached to the recorded audio (such as what repeater was being used at a certain time). A display backlight may make the display easy to read in low light conditions, such as in the case of brownout or electrical power interrupted by the emergency personal.

The ECCC may also contain built-in removable audio recorded media. Such removable audio recorded media is easily accessible, and the media storing all the communications and data files can be removed off site. The ECCC may also utilize off-site digital recording of audio transmissions, which a user may desire off-site recording for redundancy purposes. Off-site recording may be accomplished by using network or serial communication protocols (such as TCP/IP, RS-232, etc).

The ECCC may have the capability of continuously monitoring the health of the communication media to the remote redundant repeaters based on links, such as fiber optic links, CAT5x link, or any other serial protocol media interface used to interconnect the repeaters and consoles. The ECCC may contain built-in remote system monitoring and alarms that will report remotely, via network or serial communications protocols (such as TCP/IP, RS-232, RS-485, etc) or wirelessly the statuses of the repeaters and ECCC to off-site Security and Operations Center. This may allow for the timely and proper response to a situation prior to the arrival of the emergency responders.

The ECCC may also contain a built-in uninterruptible power supply that keeps the console and or repeaters functioning during the absence of electrical power.

Figure 2:
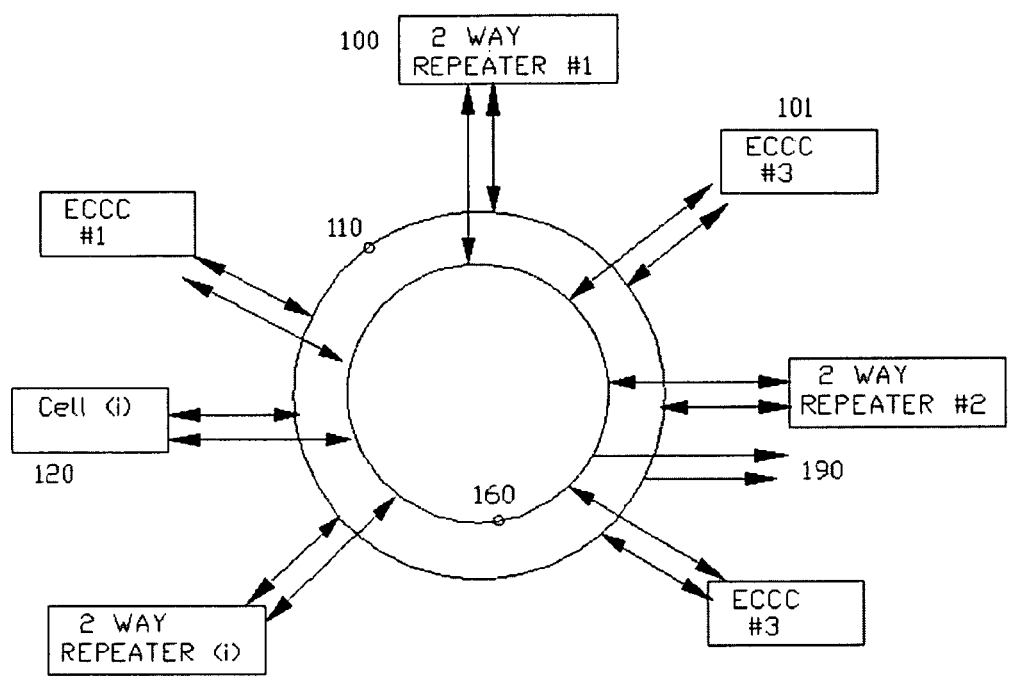
FIG. 2 depicts a high level schematic of an ECCC according to an embodiment of the present invention.

FIG. 2 represents a high level schematic of an embodiment of an ECCC according to the present invention. Referring to this FIG. 2, item 100 represents any two way radio repeater [2-WAY REPEATER (i)]. These repeaters may be located in the same building or within different buildings within a geographic area that the system serves. The two way radio repeater 100 is connected to a stand-alone console 101 [ECCC (i)]. A typical repeater is manufactured by Motorola under the name Quantar™ Repeater, Model T5365A or by Tait Electronics under the name of TB9100. A remote Cell 120, which may be used to monitor a tamper switch, indicating, e.g., forced entry into the repeater's equipment cabinet, or temperature sensor, or any other type of sensor as needed, may also be connected to the console 101.

A primary physical media (primary ring) 110 that carries a serial or networked protocol interconnects the above mentioned components. Such physical media 110 could be, for example, any fiber optical link, CAT-5x implementing a TCP/IP protocol, or an RS-485 twisted pair or any other type of media capable supporting a serially networked protocol for bidirectionally exchanging control data and or digitized audio signals. The physical media 110 could be also implemented wirelessly by using any type of protocol, such as those implemented by IEEE 802.11a,b,g or zig-bee, etc. The primary physical ring may also support the ability to operate in either direction if a single break occurs in the medium. This may be implemented using such technology as FDDI, Token Ring, SONET or appropriately configured IEEE 802.3 Ethernet type switches.

A secondary physical media (redundant ring) 160 represents a similar ring network as described with respect to the primary physical media 110, but it is used for redundancy purposes. If primary physical media 110 is cut or physically destroyed, all communications protocols may executed by using the secondary physical media 160.

Multiple repeaters 100 may each be connected to the primary ring 110 and the redundant ring 160. Accordingly, each repeater may be able to utilize both rings.

The rings 110, 160 and/or any other redundant ring, may utilize the internet, allowing inter-location redundant systems implementations. In this way, emergency personnel can take over operation of a console from an independent location.

Alternatively, the rings 110, 160 may utilize a WiFi or other wireless broadband network such as the broadband connectivity implemented by cellular phone carriers or a UMTS type network connection. As an example of a use of a wireless connection, a command control truck may have a WiFi connection and may be able to connect into the rings.

External stubs 190 may be used to further extend the capabilities of additional communications redundant rings, whether on or off site. For example, when multiple rings are present, users may be able to connect to alternative rings over the internet.

Figure 3:
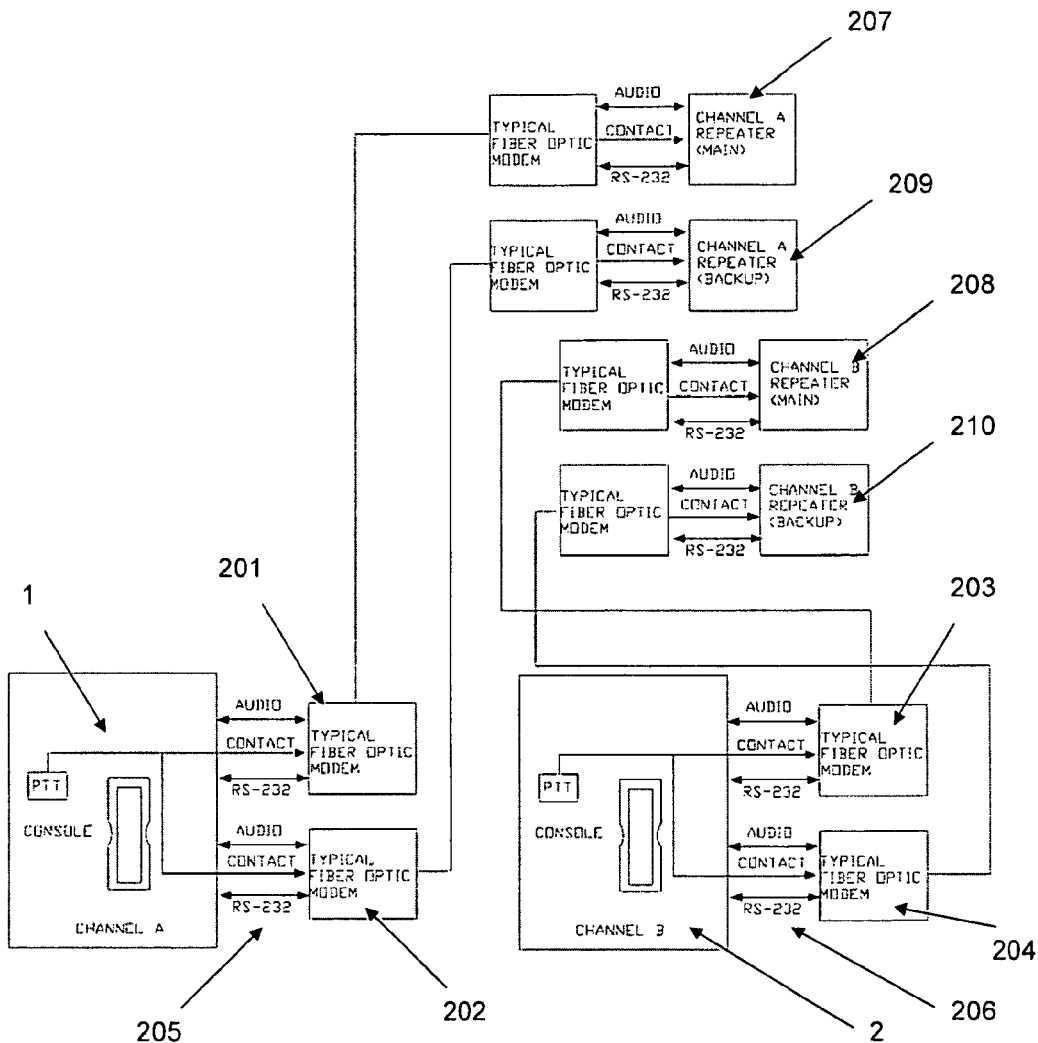
FIG. 3 depicts a high level system overview of an ECCC according to an embodiment of the present invention.

FIG. 3 shows a high level system overview of an ECCC based on embodiment of the present invention. As shown in FIG. 3, a pair of fiber optic modems (201, 202, 203, 204) may be built into each console (1, 2). The console communicates with the repeaters over a fiber network. There are three types of Input/Output signals carried on the fiber. Bi-directional audio signals are the outgoing and incoming voice. Bi-directional RS-232 lines (205, 206) provide repeater control and status. A switch contact is derived from the push-to-talk function and is used to key the transmitter. When the console is active, the console intermittently polls the repeaters to check their status. Since there are two or more repeaters, the ECCC selects one repeater as the default repeater (207, 208). In the case of failure of the primary repeater, the ECCC automatically switches to the backup repeater (209, 210).

Figure 4:
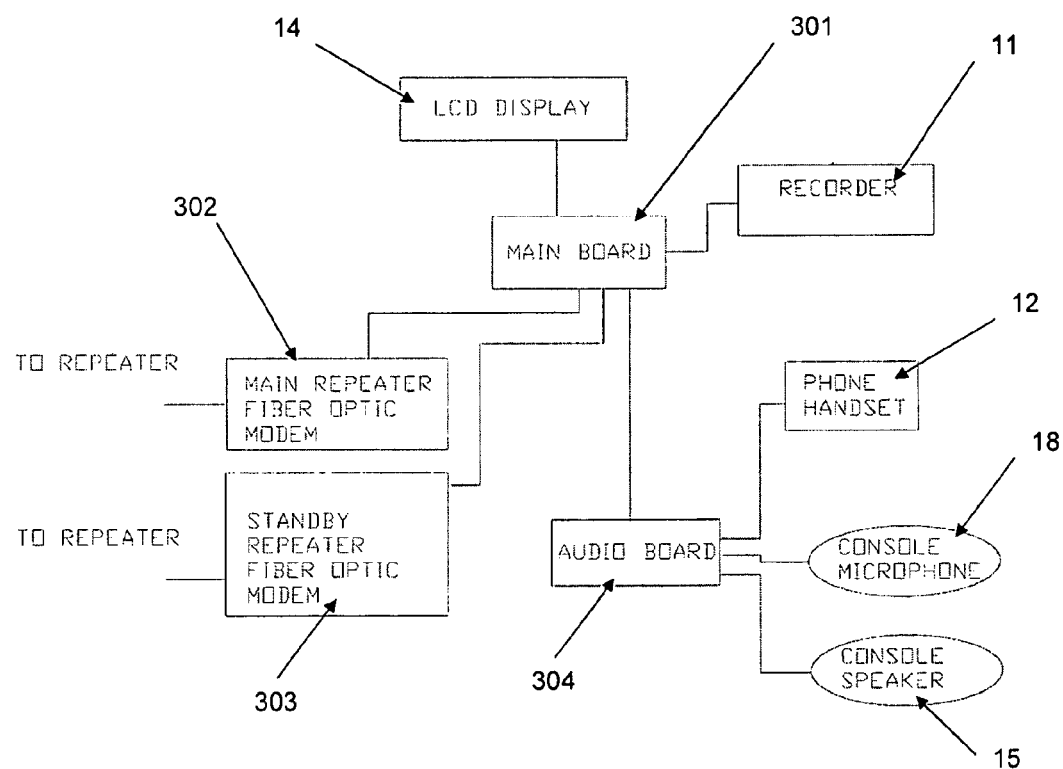
FIG. 4 depicts the internal configuration of an ECCC according to an embodiment of the present invention.

FIG. 4 shows a schematic of the internal configuration of an ECCC based on an embodiment of the present invention. The main board 301 may be a central processing unit that consists of a microprocessor, memory and bulk storage and it is used to coordinate the functions of the other subsystems. The main board connects to the main repeater fiber optic modem 302 and the standby repeater fiber optic modem 303. The fiber optic modems (302, 303) may consist of optical to electrical transceivers as well as multiplexers to combine the audio and control information into a single data stream. These modems also may implement communications protocols to assure reliable communication with each repeater. The main board 301 also connects to the LCD display 14 which may consist of a display unit including a screen that implements a pixel field and a control unit to manage the operation of the display. The main board also interfaces to the recorder 11 which may include circuits to digitize the audio stream as well as tape, disk or semiconductor memory to store the audio information, and the audio board 304 which supports the physical connection to the phone handset 12, the console microphone 18, and the console speaker 15.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

This invention has been described in detail with particular reference to certain preferred embodiments thereof, but it will be understood that variations and modifications can be effected within the spirit and scope of the invention.

I claim:

1. A communications system, comprising:
a plurality of communication networks;
a plurality of dispatch consoles for communication on said communication networks, each of said dispatch consoles having an active mode and a standby mode;
a plurality of repeaters associated with said plurality of dispatch consoles for receiving and delivering communications from said plurality of dispatch consoles on said communication networks, each dispatch console being associated with at least two repeaters;
wherein each of said plurality of dispatch consoles selects one of said plurality of communication networks for communication, and selects another of said plurality of communication networks for communication if said selected one of said plurality of communication networks becomes inoperative;
wherein each of said plurality of dispatch consoles has a repeater selection switch for user selection of one of the associated repeaters for communication; and
wherein each of said plurality of dispatch consoles is configured for automatic selection of another of said plurality of repeaters for communication if said selected one of said plurality of repeaters becomes inoperative.

2. A communications system according to claim 1, wherein at least one of said plurality of communication networks carries networked protocol wirelessly.

3. A communications system according to claim 1, wherein said plurality of dispatch consoles are not coupled to external computers.

4. A communications system according to claim 1, wherein each of said plurality of dispatch consoles further comprises: a microphone and a speaker, each built into said dispatch console for communicating with other devices; and a handset for communicating with other devices that can be used instead of said microphone and said speaker.

5. A communications system according to claim 1, wherein each of said plurality of dispatch consoles is adapted for user changing from said selected one of said plurality of repeaters to another of said plurality of repeaters.

6. A communications system according to claim 1, wherein incoming messages and outgoing messages from said plurality of dispatch consoles are recorded off-site.

7. A communications system according to claim 1, wherein said plurality of dispatch consoles can communicate wirelessly with a device at an off-site location.

8. A communications system according to claim 7, wherein said plurality of dispatch consoles can communicate wirelessly with a command control truck.

9. A communications system according to claim 1, wherein each of said dispatch consoles further comprises a status indicator for indicating whether said dispatch console is in said active mode or said inactive mode.

10. A communications system according to claim 1, wherein said plurality of repeaters includes multiple repeaters on a first floor and multiple repeaters on a second floor.

11. A communications system according to claim 1, wherein each of said dispatch consoles further comprises at least two repeater status indicators associated with said repeater selection switch, each repeater status indicator indicating the current status of a respective one of the repeaters associated with said dispatch console.

12. A communications system, comprising:
 a plurality of communication networks, wherein at least one of said plurality of communication networks carries networked protocol wirelessly;
 a plurality of dispatch consoles for communication on said communication networks, each of said dispatch consoles having an active mode and a standby mode;
 a plurality of repeaters associated with said plurality of dispatch consoles for receiving and delivering communications from said plurality of dispatch consoles on said communication networks;
 wherein each of said plurality of dispatch consoles selects one of said plurality of communication networks for communication, and selects another of said plurality of communication networks for communication if said selected one of said plurality of communication networks becomes inoperative; and
 wherein each of said plurality of dispatch consoles is adapted for user selection of one of said plurality of repeaters for communication, and for user changing from said selected one of said plurality of repeaters to another of said plurality of repeaters.

\* \* \* \* \*